Dec. 5, 1939.  W. K. BERTHOLD  2,182,167
APPARATUS FOR COOLING GLASSWARE
Filed Feb. 17, 1938  2 Sheets-Sheet 1

Witness:
W. B. Thayer

Inventor:
Walter K. Berthold
by Brown &Darlan
Attorneys

Dec. 5, 1939.   W. K. BERTHOLD   2,182,167
APPARATUS FOR COOLING GLASSWARE
Filed Feb. 17, 1938   2 Sheets-Sheet 2
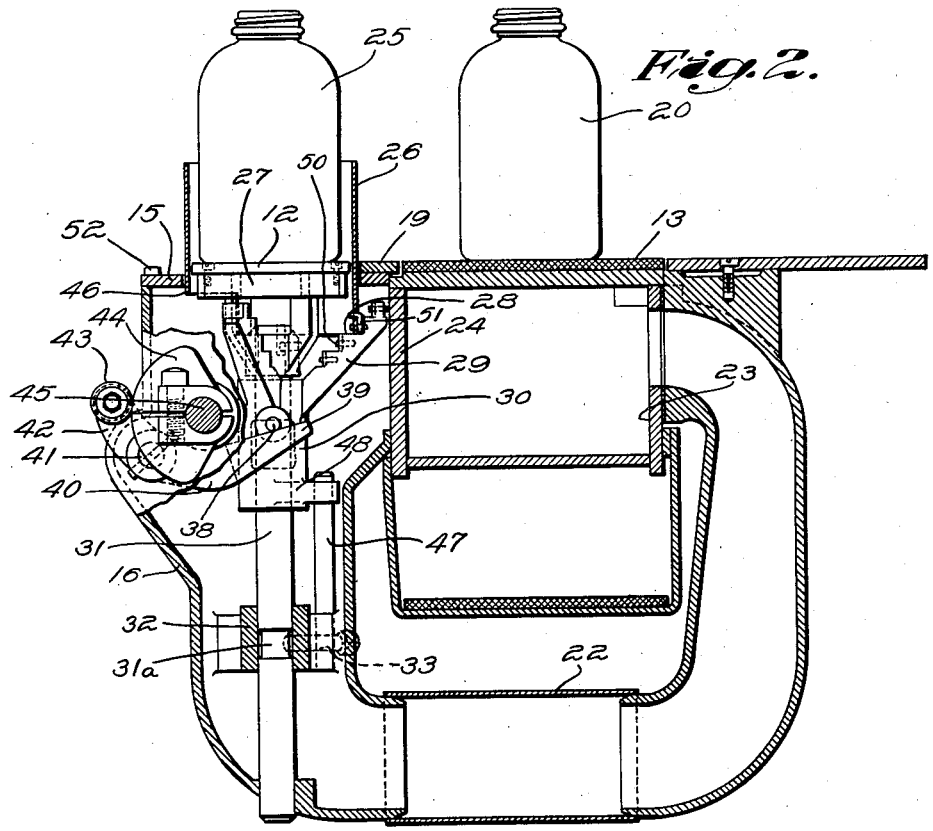
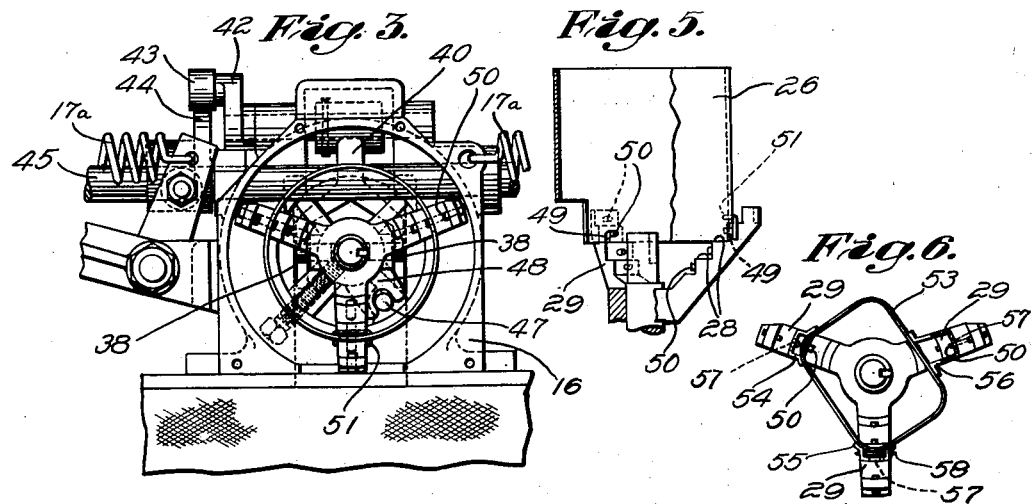
Inventor;
Walter K. Berthold
by Brown & Parham
Attorneys
Witness;
W. B. Thayer.

Patented Dec. 5, 1939

2,182,167

UNITED STATES PATENT OFFICE 2,182,167

APPARATUS FOR COOLING GLASSWARE

Walter K. Berthold, Rockville, Conn., assignor to Hartford-Empire Company, Hartford, Conn., a corporation of Delaware Application February 17, 1938, Serial No. 190,919

4 Claims. (Cl. 49—14)

This invention relates to the manufacture of articles of glassware, such as bottles, jars and the like, and more particularly to apparatus for cooling newly produced glassware.

The manufacture of articles of glassware in metal molds causes chilling of the finally formed articles at their outer surfaces, so that the outer or surface portion of the glass of each article forms a relatively stiff skin on the article. This skin or chilled surface portion of the article is sufficiently rigid to support the walls of the article while the article is being removed from the final forming mold to a dead plate or like support on which such article is disposed prior to its removal to a conveyor for transporting it to a lehr in which the article is to be annealed. However, the heat remaining in the glass of the article tends to soften the chilled external skin or surface portion of the article when that article has been removed from chilling contact with the final forming mold.

In practice, this necessitates prolongation of the time of manufacture or chilling contact of the glass in the final forming mold beyond that which would otherwise be required, so as to assure the formation of a skin of substantial thickness and rigidity at the exterior of the finally formed article. Even after such a period of prolonged chilling contact, the reheating of this skin may, in certain types of glassware cause harmful or objectionable sagging or distortion of the walls thereof.

An object of the present invention is to provide an apparatus for adequately cooling the walls of the finally formed article by the application of a cooling fluid or medium thereto to obviate objectionable sagging, distortion or change of shape of the walls of the article after such article has been removed from the final forming mold. The required time of chilling contact of the walls of the article with the final forming mold may thus be decreased. This permits speeding up of production of successive articles, the manufacture of which involves the use of the same final forming mold.

The invention may be advantageously employed to cool newly formed articles of glassware, irrespective of the particular type of forming machine that is employed for their manufacture, but is particularly well adapted for embodiment in a forming machine of the Hartford I. S. type and for cooling articles produced by a forming machine of this type.

Among the objects of the invention, therefore, is to provide an article cooling apparatus operable in conjunction with the article supporting and transferring parts of a section of a forming machine of the Hartford I. S. type to confine cooling fluid about each article of glassware on the dead plate of that section for at least a substantial part of the length of the article and for directing cooling fluid against the walls of the remainder of the article, so as to cool adequately the entire article during the period of rest of such article on the dead plate.

Other objects and advantages of the invention will hereinafter be pointed out or will become apparent from the following description of the structure and operation of a practical embodiment of the invention as applied to the Hartford I. S. forming machine and as shown in the accompanying drawings, in which:

Fig. 2 is a relatively enlarged fragmentary vertical section through a section of the I. S. forming machine and the cooling apparatus as applied thereto, the view being substantially along the line 2—2 of Fig. 1;

Fig. 3 is a plan view of the cooling apparatus and certain associate parts of a section of the I. S. forming machine as shown in the preceding views, the dead plate of such forming machine section and the parts immediately adjacent thereto being omitted to show the underneath structure;

Fig. 5 is a fragmentary vertical sectional view showing the manner of detachably securing the cooling fluid confining and directing member of the preceding views in place on its supporting arms, only two of which are shown; and Fig. 6 is a plan view of a cooling fluid confining and directing member of oblong cross-sectional configuration and adapted for use in the cooling of an article of glassware of corresponding cross-sectional configuration, the view also showing modified fastening provisions which enable this form of fluid confining and directing member to be detachably secured to and operated by the same supporting arms as are employed to support and operate the circular member of the preceding views.

Figure 1:
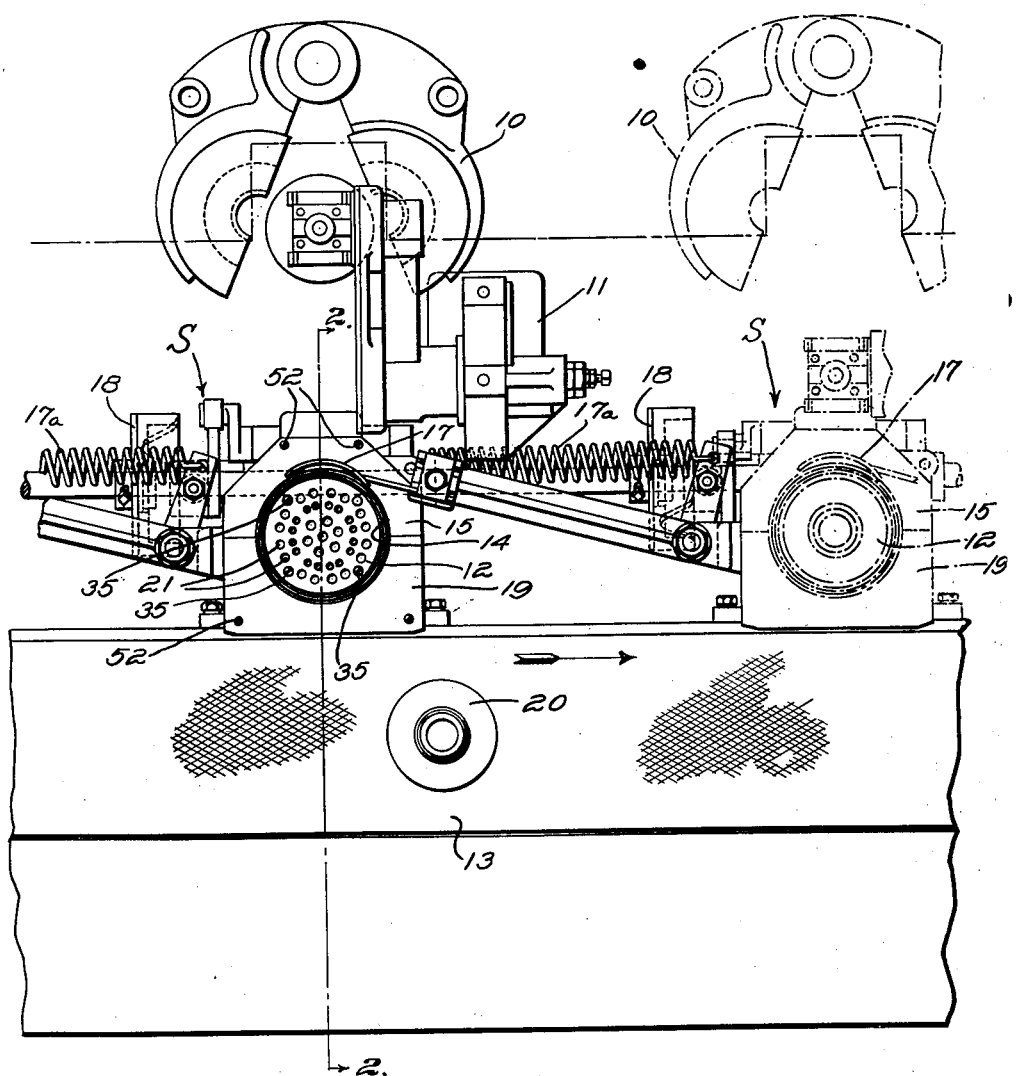
Figure 1 is a plan view of a portion of the Hartford I. S. forming machine equipped with article cooling apparatus embodying structural features of the present invention, many structural elements of this type of forming machine which are not pertinent to the present invention being omitted and certain of the illustrated parts being shown more or less diagrammatically.

In Fig. 1, two sections, each generally designated S, of the Hartford I. S. forming machine are shown. Each of these sections includes a final forming mold unit 10, from which each finally formed article is transferred by a take-out mechanism 11 (shown for only one of the sections) to a dead plate 12 adjacent to a conveyor belt 13. The dead plate 12 is disposed in an opening 14 in the top 15 of a housing 16, Fig. 2, in which the dead plate supporting structure is disposed, as presently will be explained.

A horizontally oscillatory pusher bar 17 is swung periodically by suitable operating mechanism 18, Fig. 1, from the position shown in Fig. 1 to position to push an article from the dead plate 12 across a slide plate 19 onto the conveyor belt 13. One such article, designated 20, is shown on the conveyor belt 13 in Figs. 1 and 2. The pusher bar 17 is returned to the position shown in Fig. 1 by the spring 17a. The upper surfaces of the dead plate 12, the intermediate slide plate 19 and the conveyor belt 13 lie in the same plane, as shown to advantage in Fig. 2.

Figure 4:
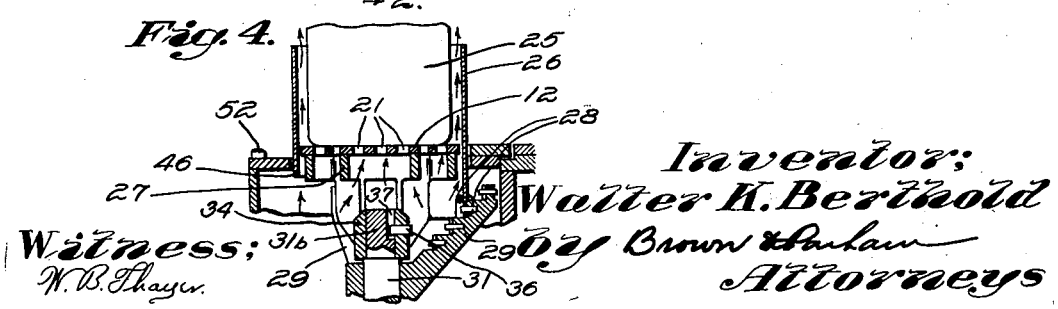
Fig. 4 is a fragmentary vertical section through the dead plate and adjacent parts of the section of the forming machine and through cooling apparatus embodying the present invention as applied thereto.

The dead plate 12 is provided with perforations, as indicated at 21 in the left hand portion of the structure shown in Fig. 1 and as also shown in Fig. 4. The housing 16 has substantially airtight walls, except at its top, and is connected by a conduit 22 with a source of supply of cooling fluid, which may include the chamber 23 within a hollow supporting structure 24 for the conveyor 13 (see Fig. 2). The cooling fluid may be air which may be supplied to the chamber 23 from any suitable source of supply.

Fig. 2 shows a newly formed article of glassware, designated 25, on the dead plate 12 of a forming machine section. The present invention provides a cooling fluid confining and directing wall, represented by the tubular member 26, in position to surround the article 25, Figs. 2 and 4, for a sufficient part of its height to confine and direct the cooling air as required to assure adequate cooling of the entire article on the dead plate.

Since the article is moved horizontally from the dead plate across the intermediate slide plate 19 onto the adjacent conveyor 13 in the usual operation of the Hartford I. S. machine, the invention, when applied to a machine of that type, makes provision for reciprocating the cooling fluid confining and directing member 26 to lower it until its upper edge is at least as low as the dead plate at the time the pusher bar 17 is operated to push the article from the dead plate onto the conveyor. The cooling fluid confining and directing member 26 preferably corresponds substantially in cross-sectional configuration with that of the article on the dead plate, being sufficiently greater than the article to cooperate therewith to confine cooling fluid against the lower portion of the article and to direct, as from an annular nozzle, the upwardly moving cooling fluid against the walls of the remainder of the article. The lower portion of the member 26 depends through the aperture 14 in the top of the housing 16 around and in spaced relation with the dead plate 12 and with a supporting open-work head 27 on which the dead plate is carried. At its lower end, the member 26 rests upon corresponding appropriate steps 28 which are provided in the upper surfaces of a plurality of symmetrically disposed outwardly inclined or spreading arms 29 which are carried by and may be integral with a vertically reciprocable sleeve 30. The sleeve 30 is mounted for vertical reciprocation on a vertical shaft 31 in the housing 16.

The shaft 31 depends through a fixed bearing 32 within the housing 16 and is held against vertical displacement by a set screw 33, the tip portion of which enters and engages a grooved portion 31a of the shaft. The shaft 31 has a reduced upper end portion 31b, Fig. 4, on which fits the hollow stem portion 34 of the open-work supporting head 27, on which the dead plate 12 is supported. The dead plate may be secured to the head 27 by screws 35, Fig. 1.

A pin 36 is carried by the stem 34 and projects into a longitudinal slot or groove 37 in the reduced upper end portion 31b of the shaft 31, so as to prevent the dead plate supporting head 27 and its attached dead plate from turning about the axis of the shaft 31 while permitting the dead plate supporting head and the dead plate to be displaced as a unit in an upward direction when desired, for a purpose which will be hereinafter pointed out.

The vertically reciprocable sleeve 30 is provided with oppositely extending pins 38, Fig. 3, resting upon the forks 39 of a rocker arm 40 which is carried by a horizontal rock shaft 41. The rock shaft 41 is journaled in bearings on opposite side walls of the housing 16 and a portion thereof outside of the housing carries an actuating arm 42 having a roller 43 riding on the periphery of a cam 44. The cam 44 is mounted on a cam shaft 45 which extends through the housing 16 and is a usual part of the I. S. forming machine, being the shaft which carries the actuating mechanism for operating the pusher bars 17 to move articles from the dead plate of each section of the forming machine onto the adjacent conveyor 13.

Rotation of the cam shaft 45 and the engagement of the cam 44 with the roller 43 will cause the sleeve 30 and the cooling fluid confining and directing member 26 on the arms 29 to be raised periodically to the position shown best in Figs. 2 and 4, and thereafter lowered into the housing 16. The cam 44 is so shaped that this vertical reciprocation of the member 26 will be of sufficient extent and of such character as to cause the upper edge of the member 26 to be lowered to a level not above that of the dead plate 12 at the time the pusher bar 17 is actuated to move an article from the dead plate onto the conveyor. Thereafter, the member 26 is raised to encircle the next article to be placed on the dead plate by the associated takeout mechanism 11.

The cooling fluid passing from the supply line to the housing 16 will be directed upwardly through the dead plate supporting head 27 and the apertures 21 in the dead plate 12 against and around the bottom of the article 25. At the same time, cooling fluid from the housing 16 will pass around the dead plate supporting head and the dead plate between the member 26 and the article on the dead plate, all substantially as indicated by the arrows in Fig. 4. The lower portion of the member 26 may be cut away for part of its circumference, as at 46, Figs. 1 and 4, to clear the cam shaft 45 when the member 26 is in its lower or retracted position.

An upstanding guide pin 47 on the fixed bearing 32 cooperates with the forked or grooved end of a guiding arm 48 on the sleeve 30 (see Figs. 2 and 3) to prevent rotary movement of the sleeve 30 and the parts carried thereby about the axis of the shaft 31 as the sleeve is reciprocated vertically.

It is apparent that the article may be removed from the dead plate 12 or from any other suitable support on which such article may be disposed for the cooling operation by a transfer mechanism operable to move the article vertically sufficiently to clear the cooling fluid confining and directing member before imparting a horizontal movement thereto. In such event, the fluid confining and directing member need not be reciprocated or mounted on mechanism operable to reciprocate it. Takeout or transfer devices operating in this way are well known in the art, and a further description or illustration of an example thereof therefore is believed to be unnecessary.

It is desirable for most types of bottles and like articles of glassware of both circular and non-circular configuration in cross-section that the space for cooling fluid should be of substantially uniform relatively slight width. To this end, the dead plate and its supporting head, the top structure of the housing 16 around the dead plate, and the cooling fluid confining and directing member are all quickly removable and may be replaced by functionally similar parts of more appropriate shapes or dimensions when the shape or cross-sectional dimension of the article to be cooled has been changed. It will be noted, particularly by reference to Figs. 2, 4 and 5, that the supporting arms 29 have series of supporting steps 28 located at different levels and at different radial distances from the axial line of the supporting shaft 31, the uppermost of the steps 28 being farthest from the axial line of the shaft. Circular cooling fluid confining and directing members of different diameters, one of which is represented by the member 26 of Figs. 1 to 5, inclusive, thus may be supported at different times on the same arms 29, the lower end of each such member resting upon the particular steps 28 which are located at the appropriate radial distance from the axis of the shaft 31. Such members may be of different lengths, so that their lower ends may be supported at different levels in the housing 16 when the members are in raised positions and their upper end portions surround predetermined adequate portions of the articles to be cooled. Each such fluid confining and directing member has right angular kerfs or slots 49 (see the left hand kerf or slot 49 in Fig. 5) in its lower edge portion adapted to engage with inwardly projecting pins 50 which are provided on the arms 29 above and closely adjacent to the several steps 28. To detachably secure the member 26 to the arms 29, it is only necessary to lower such member onto the appropriate supporting steps 28, so that the pins 50 above such steps will pass through the open lower ends of the vertical portions of the slots 49 to the upper ends thereof and then to rotate the member 26 slightly in the proper direction to cause these pins to enter the horizontal portions of these slots. A suitable pivoted latch 51 (see Figs. 3 and 5) may be carried by the member 26 and be swung into contact with the adjacent arm 29 when the member 26 has been secured in place on the arms 29 to prevent unintended or accidental return rotary movement of the member 26 on its supporting arms 29. Any suitable latching means may be employed for this purpose.

When a cooling fluid confining and directing member is removed for replacement by a similar member of a different size or shape, the dead plate and its supporting head and the parts constituting the top of the housing 16 around the dead plate will also be removed and replaced by parts of like function, but of more appropriate dimensions or shapes. It will be noted that the parts of the top of the housing 16 around the dead plate are detachable, being secured to the body of the housing by screws 52.

If required, lateral supporting elements, portions or arms may be provided at the lower ends of cooling fluid confining and directing members of non-circular configuration in cross-section, in order to adapt such members to be supported firmly on and detachably secured to the supporting arms 29. An example of such a non-circular member is shown in Fig. 6, being designated 53. This member is provided with lateral supporting arms 54, 55 and 56, respectively, adapted to rest firmly on appropriate steps 28 on the supporting arms 29. Each of the elements 54, 55 and 56 is provided with a right angular or bayonet slot 57 adopted for engagement with the adjacent pin 50 on the supporting arm 29 in the manner previously described. One of the elements 54, 55 or 56, as for example the element 55, may be provided with a pivoted latch 58, also similar to that previously described, for engaging the adjacent arm 29 to prevent accidental or unintended detachment of the member 53 from the supporting arms 29.

The invention is not to be limited to the details of construction shown in the accompanying drawings and described herein, but extends to all structures and operations which are covered by the terms of the appended claims.

I claim:

1. In combination, a perforated dead plate on which a newly produced article of glassware may be disposed, a vertically reciprocable tubular member adapted to surround said dead plate and the article thereon in spaced adjacent relation with the dead plate and article, means for reciprocating said tubular member to raise the upper end of the member to a level located a substantial distance above the bottom of the article on the dead plate and thereafter to lower said tubular member until the upper end thereof is not above the level of the dead plate, and means for applying cooling fluid to said article through the perforations in the dead plate and the space between said article and the surrounding tubular member when said tubular member is in its raised position.

2. In combination, a housing having a removable top structure comprising a central perforated dead plate and surrounding parts spaced from said dead plate by an intervening space, said dead plate being adapted to support a newly formed article of glassware thereon, a removably supported tubular cooling fluid confining and directing member extending upwardly from the interior of the housing through the space between the dead plate and the surrounding housing top parts, the upper portion of said fluid confining and directing member surrounding the article of glassware on the dead plate for at least part of the length of said article, and means for supplying cooling fluid to the housing for application to said article via the perforations in said dead plate and the space between said article and the cooling fluid confining and directing member.

3. In combination, a housing having a removable top structure comprising a central perforated dead plate and surrounding parts spaced from said dead plate by an intervening space, said dead plate being adapted to support a newly formed article of glassware thereon, a removably supported tubular cooling fluid confining and directing member extending upwardly from the interior of the housing through the space between the dead plate and the surrounding housing top parts, the upper portion of said tubular member surrounding the article of glassware on the dead plate in spaced relation therewith, means for supplying cooling fluid to the housing for application to said article of glassware through the perforations in said dead plate and the space between said article and the surrounding tubular member, said tubular member conforming substantially in cross central configuration with the article of glassware on the dead plate but being of greater cross sectional dimensions.

4. In combination, a housing having a removable top structure including a central perforated dead plate spaced from the surrounding parts of the top structure by an intervening space, said dead plate being adapted to support a newly formed article of glassware thereon, a tubular cooling fluid confining and directing member extending upwardly from the interior of the housing through the space between the dead plate and the surrounding parts of the top of the housing, means for supplying cooling fluid to the housing for passage upwardly through the perforations in the dead plate and between the dead plate and said cooling fluid confining and directing member, and means within said housing for removably supporting said fluid cooling confining and directing member and for reciprocating it vertically to raise the upper end of said member above the level of the dead plate in surrounding relation with the article of glassware on the dead plate and thereafter to lower the upper end of said member to the level of the dead plate to permit said article to be moved horizontally from the dead plate.

WALTER K. BERTHOLD.